(12) United States Patent
Lin et al.

(10) Patent No.: US 11,520,099 B2
(45) Date of Patent: Dec. 6, 2022

(54) BACKLIGHT MODULE

(71) Applicant: Coretronic Corporation, Hsin-Chu (TW)

(72) Inventors: Yan-Ching Lin, Hsin-Chu (TW); Yen-Hao Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/502,043

(22) Filed: Oct. 15, 2021

(65) Prior Publication Data

US 2022/0146735 A1    May 12, 2022

(30) Foreign Application Priority Data

Nov. 12, 2020 (CN) .......................... 202011259157.8

(51) Int. Cl.
F21V 8/00 (2006.01)

(52) U.S. Cl.
CPC ......... *G02B 6/0036* (2013.01); *G02B 6/0051* (2013.01); *G02B 6/0053* (2013.01); *G02B 6/0055* (2013.01); *G02B 6/0088* (2013.01)

(58) Field of Classification Search
CPC .. G02B 6/0036; G02B 6/0051; G02B 6/0053; G02B 6/0055; G02B 6/0088
See application file for complete search history.

(56) References Cited

U.S. PATENT DOCUMENTS 7,876,489 B2 * 1/2011 Gandhi ................ G02B 6/0055
359/290

2009/0207344 A1 * 8/2009 Ono ..................... G02B 6/0038
362/626
2020/0379159 A1 * 12/2020 Li .......................... G02B 6/0053

FOREIGN PATENT DOCUMENTS

| CN | 102053421  | 5/2011  |
| CN | 103676311  | 3/2014  |
| JP | 2005259361 | 9/2005  |
| TW | 200844487  | 11/2008 |
| TW | 201232072  | 8/2012  |
| TW | 201344307  | 11/2013 |

(Continued)

OTHER PUBLICATIONS

"Office Action of Taiwan Counterpart Application", dated Nov. 19, 2021, p. 1-p. 6.

*Primary Examiner* — Andrew J Coughlin
*Assistant Examiner* — Jessica M Apenteng
(74) *Attorney, Agent, or Firm* — JCIPRNET

(57) ABSTRACT

A backlight module including a light source, a light guiding element, a brightness enhancement component, and a reflecting part is provided. A plate body of the light guiding element has an upper surface, a lower surface, and a light incident surface. A plurality of optical microstructures of the light guiding element are formed on the lower surface. The brightness enhancement component is disposed on a side of the upper surface. The brightness enhancement component includes two brightness enhancement films having a plurality of prism structures and disposed perpendicular to each other. The reflecting part is disposed on a side of the lower surface in the light guiding element. Each of the optical microstructures has a light receiving surface and a shady surface, and an angle between the light receiving surface and the lower surface is ranged between 2 degrees and 12 degrees.

7 Claims, 3 Drawing Sheets

(56) References Cited

FOREIGN PATENT DOCUMENTS

| TW | 201939132 | 10/2019 |
|---|---|---|
| TW | 202016624 | 5/2020 |

\* cited by examiner

BACKLIGHT MODULE

CROSS-REFERENCE TO RELATED APPLICATION

This application claims the priority benefit of China application serial no. 202011259157.8, filed on Nov. 12, 2020. The entirety of the above-mentioned patent application is hereby incorporated by reference herein and made a part of this specification.

BACKGROUND

Technical Field

The invention relates to an optical module, and in particular to a backlight module.

Description of Related Art

The main function of light guide plate is to guide the direction of light, thereby improving the brightness of an optical module and regulating the uniformity of the brightness. After the light enters the light guide plate, the light guide plate, due to a total internal reflection characteristic thereof, can transmit the light to the other end of the light guide plate. Furthermore, in order to allow the light to be emitted from a top surface of the light guide plate, generally, dots are disposed on a bottom surface of the light guide plate. When the light incidents the dots on the bottom surface, reflected light spreads to different angles, so the light may be emitted from the top surface of the light guide plate. Next, the light is corrected through a lower diffusion sheet, a prism sheet, and an upper diffusion sheet in sequence to produce forward light emission, so as to enhance the brightness.

In the current development context of the prism sheet, a high gain brightness enhancement film (high gain BEF) with a material having a high refractive index has been used. The high gain BEF may replace current brightness enhancement film products, and may increase the brightness by about 10% in a current backlight module architecture. However, the current backlight module structure is not a design for an optimal brightness.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a backlight module, which converges a light-emitting angle of an emitted light beam to the optimum, and an overall luminous intensity is increased through a brightness enhancement component.

Other objectives and advantages of the invention may be further understood from technical features disclosed in the invention.

In order to achieve one or part or all of the objectives described above or other objectives, the invention provides a backlight module, including a light source, a light guiding element, a brightness enhancement component, and a reflecting part. The light source is adapted for providing a light beam. The light guiding element is disposed on a transmission path of the light beam. The light guiding element includes a plate body and multiple optical microstructures. The plate body has an upper surface, a lower surface, and a light incident surface connected between the upper surface and the lower surface. The light source is disposed on a side of the light incident surface. The optical microstructures are formed on the lower surface. The brightness enhancement component is disposed on a side of the upper surface in the light guiding element. The brightness enhancement component includes two brightness enhancement films each having multiple prism structures and disposed perpendicular to each other. The reflecting part is disposed on a side of the lower surface in the light guiding element. The light guiding element is located between the brightness enhancement component and the reflecting part. Each of the optical microstructures has a light receiving surface and a shady surface, and an angle between the light receiving surface and the lower surface is ranged between 2 degrees and 12 degrees.

Based on the above, the embodiments of the invention have at least one of the following advantages or efficacies. In the backlight module of the invention, the light guiding element includes the plate body and the multiple optical microstructures located below the plate body. The plate body has the upper surface and the lower surface opposite to each other. Each of the optical microstructures has the light receiving surface. The angle between the light receiving surface and the lower surface is ranged between 2 degrees and 12 degrees. In this way, the light-emitting angle of the light beam may be converged to the optimum through the optical microstructures on the light guiding element, and the overall luminous intensity is increased through the brightness enhancement component.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the FIG.(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to." Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A "Component is directly "adjacent to" "B" component or one or more additional components are between "A" component and "B" component. Accordingly, the drawings and descriptions will be regarded as illustrative in nature and not as restrictive.

Figure 1:
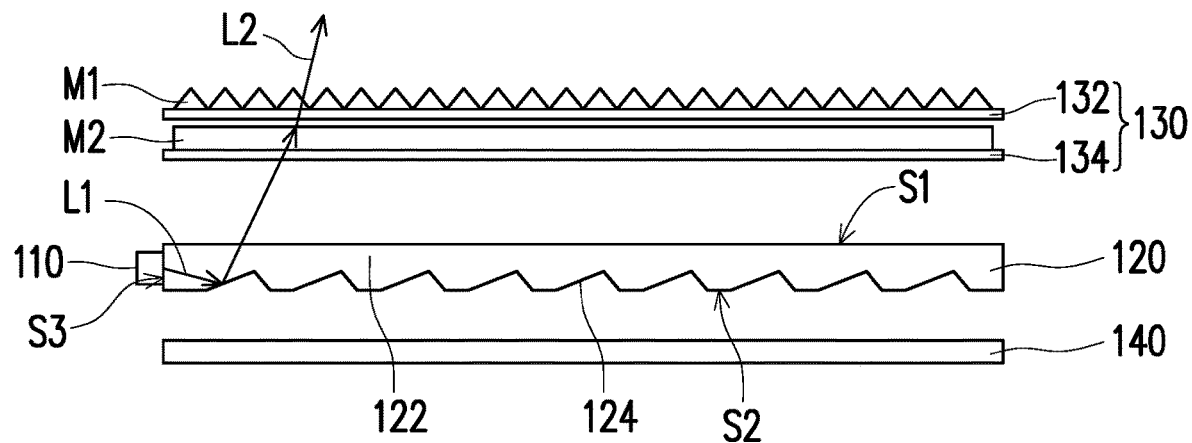
FIG. 1 is a schematic cross-sectional view of a backlight module according to an embodiment of the invention.

FIG. 1 is a schematic cross-sectional view of a backlight module according to an embodiment of the invention. Referring to FIG. 1, the invention provides a backlight module 100, which is adapted for providing an illuminating light beam L2 and configured as a surface light source for a display panel (not shown) in a display device. Specifically, the backlight module 100 includes a light source 110, a light guiding element 120, a brightness enhancement component 130, and a reflecting part 140. In this embodiment, the backlight module 100 is, for example, a side-entry backlight module.

The light source 110 is adapted for providing a light beam L1, and the light guiding element 120 is disposed on a transmission path of the light beam L1. The light source 110 is, for example, an LED white light, but the invention is not limited thereto. The light guiding element 120 includes a plate body 122 and multiple optical microstructures 124. The plate body 122 has an upper surface S1, a lower surface S2, and a light incident surface S3 connected between the upper surface S1 and the lower surface S2. The upper surface S1 and the lower surface S2 are disposed oppositely. The upper surface S1 is parallel to the lower surface S2, and the upper surface S1 and the lower surface S2 are both perpendicular to the light incident surface S3. The light source 110 is disposed on a side of the light incident surface S3. The optical microstructures 124 are formed on the lower surface S2. The upper surface S1 serves as a light emitting surface of the light guiding element 120. A detailed structure will be illustrated Specifically in subsequent paragraphs.

The brightness enhancement component 130 is disposed on a side of the upper surface S1 of the light guiding element 120. In detail, the brightness enhancement component 130 includes two brightness enhancement films each having multiple prism structures and disposed perpendicular to each other. Specifically, the brightness enhancement component 130 includes a first brightness enhancement component 132 having a first prism structure M1 and a second brightness enhancement component 134 having a second prism structure M2. The second brightness enhancement component 134 is located between the first brightness enhancement component 132 and the light guiding element 120. The first prism structure M1 is disposed on a surface of the first brightness enhancement component 132 facing away from the light guiding element 120 (for example, a positive prism sheet). The second prism structure M2 is disposed on a surface of the second brightness enhancement component 134 facing away from the light guiding element 120 (for example, a non-reverse prism sheet). An extension direction of the first prism structure M1 and an extension direction of the second prism structure M2 are substantially perpendicular. In other words, the first brightness enhancement component 132 and the second brightness enhancement component 134 are placed perpendicularly, and the prism structures both face away from the light guiding element 120. The first prism structure M1 and the second prism structure M2 may be a same prism structure or different prism structures, and the invention is not limited thereto. In this embodiment, a material of the brightness enhancement component 130 includes, for example, a light-transmitting material (the brightness enhancement component 130 may be made of light-transmitting plastic), and a refractive index of the light-transmitting material is ranged between 1.6 and 1.65. For example, the brightness enhancement component 130 of this embodiment is, for example, a high gain brightness enhancement film (high gain BEF). The high gain BEF may improve a brightness of the backlight module 100. In some embodiments, the material of the brightness enhancement component 130 may be made of the light-transmitting glue, and the invention is not limited thereto.

The reflecting part 140 is disposed on a side of the lower surface S2 of the light guiding element 120. The light guiding element 120 is located between the brightness enhancement component 130 and the reflecting part 140. The reflecting part 140 is adapted for reflecting light emitted from the lower surface S2 of the light guiding element 120 back to the light guiding element 120. In this embodiment, the reflecting part 140 is, for example, a specular reflecting mirror. Due to a high level of flatness of a reflective surface of the reflecting part 140, the reflecting part 140 may enable a reflection of light to be more convergent (or reduce a diffuse reflection thereof) and have more directivity, and the reflected light may be transmitted toward a specific area and angle, thereby improving the efficiency of light use.

Figure 2:
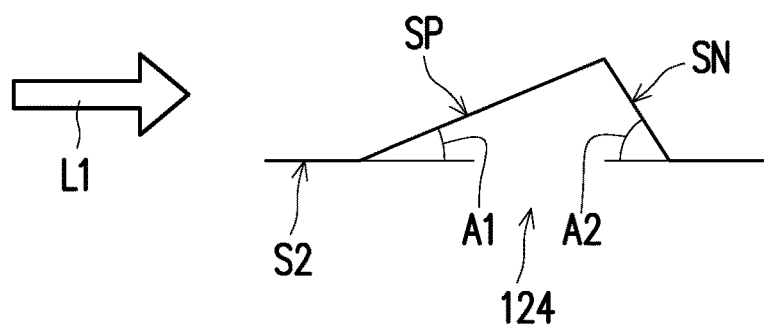
FIG. 2 is a schematic cross-sectional view of a single optical microstructure in FIG. 1.

FIG. 2 is a schematic cross-sectional view of a single optical microstructure in FIG. 1. Referring to FIGS. 1 and 2, the optical microstructures 124 are formed on the lower surface S2 of the plate body 122. These optical microstructures 124 may be arranged in arrays, gradients, and other types of regular or irregular arrangements on the lower surface S2, and the invention is not limited thereto. In addition, the optical microstructures 124 may have different shapes. For example, in this embodiment, the optical microstructures 124 are microstructures recessed inward from the lower surface S2. However, in other embodiments, the optical microstructures 124 may be microstructures protruding outward from the lower surface S2, or may be groove structures, and the invention is not limited thereto.

In this embodiment, the light source 110 (shown in FIG. 1) is disposed on a left side of the optical microstructure 124. Each of the optical microstructures 124 has a light receiving surface SP and a shady surface SN. In this embodiment, since the optical microstructures 124 are recessed from the lower surface S2 toward the plate body 122, the light receiving surface SP of the optical microstructures 124 is located between the light source 110 (light incident surface S3) and the shady surface SN. An angle A1 between the light receiving surface SP and the lower surface S2 is ranged between 2 degrees and 12 degrees. In an exemplary embodiment, the angle A1 between the light receiving surface SP and the lower surface S2 is 7 degrees. When the light beam L1 enters the light guiding element 120 from the light incident surface S3, the light beam L1 is repeatedly transmitted and reflected inside the plate body 122, and the light is transmitted and emitted from a designated area of the plate body 122 through a reflection on the light receiving surface SP of the optical microstructure 124. It is to be noted that, the light receiving surface SP is, for example, a surface facing both the light incident surface S3 and the upper surface S1, but the invention is not limited thereto.

In this way, with the disposition and structural design of this embodiment, the light beam L1, after entering the light guiding element 120, changes a direction of travel thereof through a total internal reflection or refraction on the optical microstructure 124 of the lower surface S2. The light beam L1 emits from the upper surface S1 of the light guiding element 120. Next, through the brightness enhancement component 130 on the upper side, the light beam L1 is converged to the optimum to form the illumination light beam L2 with an improved optical performance. Related experiments show that, compared with a general backlight module disposition, a brightness gain of the backlight module 100 of this embodiment may be at least 1.45 times that of the general disposition. In this embodiment, the angle A2 between the shady surface SN and the lower surface S2 is ranged between 5 degrees and 90 degrees, but the invention is not limited thereto.

Figure 3:
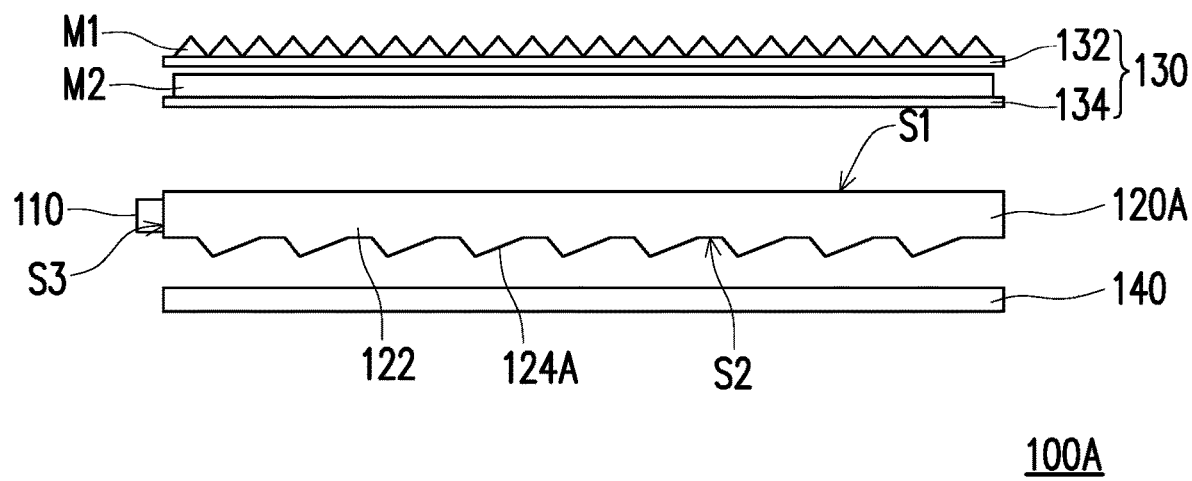
FIG. 3 is a schematic cross-sectional view of a backlight module according to another embodiment of the invention.
Figure 4:
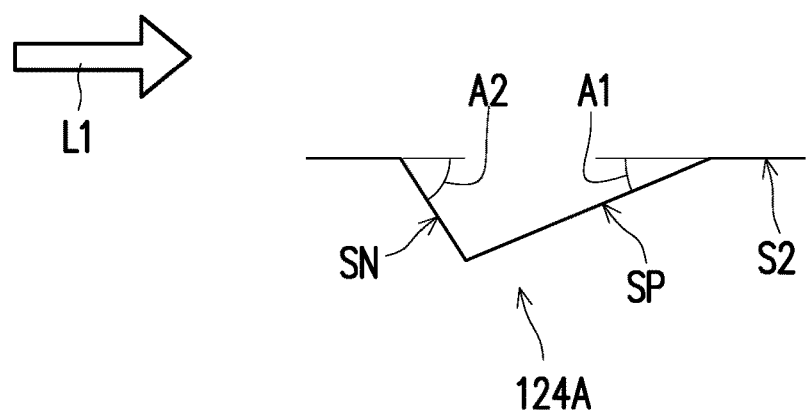
FIG. 4 is a schematic cross-sectional view of a single optical microstructure in FIG. 3.

FIG. 3 is a schematic cross-sectional view of a backlight module according to another embodiment of the invention. FIG. 4 is a schematic cross-sectional view of a single optical microstructure in FIG. 3. Referring to FIG. 3 and FIG. 4, a backlight module 100A of this embodiment is similar to the backlight module 100 shown in FIG. 1. Differences between the two are that in this embodiment, an optical microstructure 124A of a light guiding element 120A protrudes from the lower surface S2 away from the plate body 122, and that in this embodiment, the shady surface SN is located between the light source 110 and the light receiving surface SP. The angle A1 between the light receiving surface SP and the lower surface S2 is ranged between 2 degrees and 12 degrees. In the exemplary embodiment, the angle A1 of the light receiving surface SP and the lower surface S2 is 7 degrees. When the light beam L1 enters the light guiding element 120 from the light incident surface S3, the light beam L1 is repeatedly transmitted and reflected inside the plate body 122, and the light beam L1 is transmitted inside the plate body 122 through a reflection on the light receiving surface SP of the optical microstructure 124, and the light is transmitted and emitted from a designated area of the plate body 122. In this way, an overall luminous intensity of the backlight module 100A is further improved by the design as described above.

Figure 5:
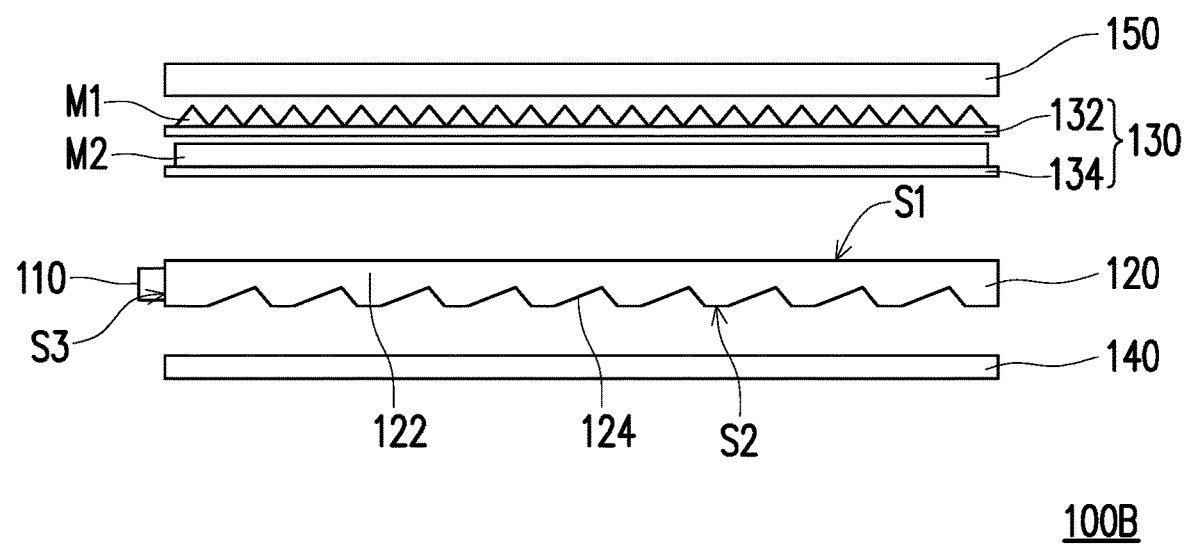
FIG. 5 is a schematic cross-sectional view of a backlight module according to another embodiment of the invention.

FIG. 5 is a schematic cross-sectional view of a backlight module according to another embodiment of the invention. Referring to FIG. 5, a backlight module 100B of this embodiment is similar to the backlight module 100 shown in FIG. 1. A difference between the two is that in this embodiment, the backlight module 100B further includes a diffusing part 150 disposed above the brightness enhancement component 130. Specifically, the brightness enhancement component 130 is located between the diffusing part 150 and the light guiding element 120. In this embodiment, the diffusing part 150 is, for example, a low-haze diffusion sheet (not a general upper diffusion sheet) with a haze less than 80%. In an exemplary embodiment, the haze of the diffusing part 150 is, for example, 30%, 60%, or ranged between 30% and 60%. In this way, a provided illuminating light beam may be further uniformized.

Figure 6:
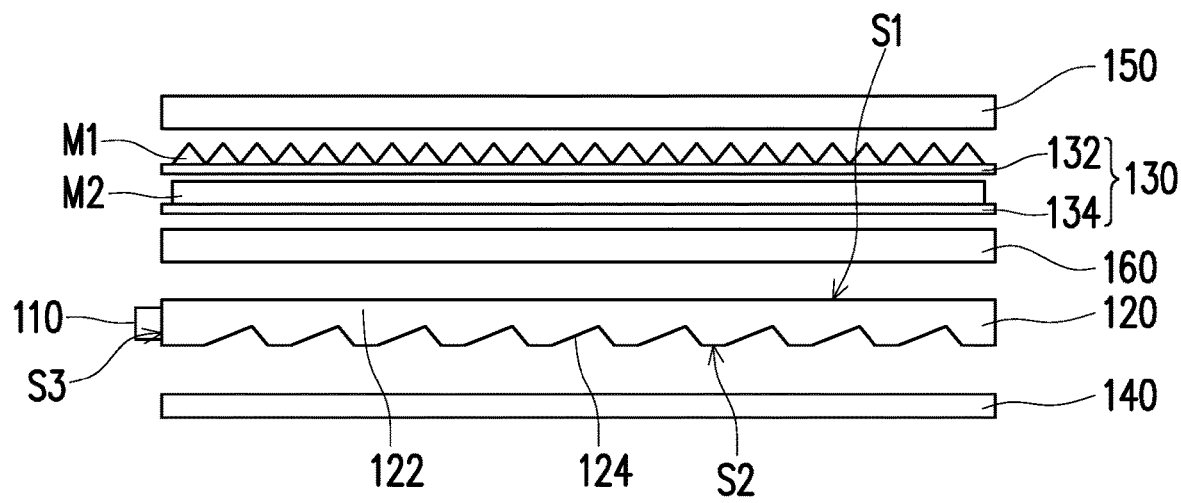
FIG. 6 is a schematic cross-sectional view of a backlight module according to another embodiment of the invention.

FIG. 6 is a schematic cross-sectional view of a backlight module according to another embodiment of the invention. Referring to FIG. 6, a backlight module 100C of this embodiment is similar to the backlight module 100B shown in FIG. 5. A difference between the two is that in this embodiment, the backlight module 100C further includes an optical part 160 disposed between the brightness enhancement component 130 and the light guiding element 120. The optical part 160 is, for example, a low-haze light-transmitting element with a haze less than or equal to the haze of the diffusing part 150. That is, the haze of the optical part 160 is less than 80%. In an exemplary embodiment, the haze of the optical part 160 is, for example, 30%, 60%, or ranged between 30% and 60%. In this way, when the light beam emitted by the light source 110 passes through the optical part 160, a light-emitting angle of the light beam L1 may be more concentrated and the light beam L1 may be transmitted in a more forward direction through a low-haze optical effect. Accordingly, a luminous brightness and an optical quality of the backlight module 100C may be improved.

In summary, in the backlight module of the invention, the light guiding element includes the plate body and the multiple optical microstructures located below the plate body. The plate body has the upper surface and the lower surface opposite to each other. Each of the optical microstructures has the light receiving surface. The angle between the light receiving surface and the lower surface is ranged between 2 degrees and 12 degrees. In this way, the light-emitting angle of the light beam may be converged to the optimum through the optical microstructures on the light guiding element, and the overall luminous intensity is increased through the brightness enhancement component.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A backlight module, comprising a light source, a light guiding element, a brightness enhancement component, a reflecting part, a diffusing part, and an optical part wherein:
   the light source is adapted for providing a light beam;
   the light guiding element is disposed on a transmission path of the light beam, the light guiding element comprises a plate body and a plurality of optical microstructures, the plate body has an upper surface, a lower surface, and a light incident surface connected between the upper surface and the lower surface, the light source is disposed on a side of the light incident surface, and the optical microstructures are formed on the lower surface;
   the brightness enhancement component is disposed on a side of the upper surface of the light guiding element, and the brightness enhancement component comprises two brightness enhancement films each having a plurality of prism structures and disposed perpendicular to each other;
   the reflecting part is disposed on a side of the lower surface of the light guiding element, and the light guiding element is located between the brightness enhancement component and the reflecting part, wherein each of the optical microstructures has a light receiving surface and a shady surface, and an angle between the light receiving surface and the lower surface is ranged between 2 degrees and 12 degrees;
   the reflecting part is a specular reflecting mirror;
   the diffusing part disposed above the brightness enhancement component, wherein the brightness enhancement component is located between the diffusing part and the light guiding element;
   the optical part disposed between the brightness enhancement component and the light guiding element, wherein a haze of the optical part is less than 80%, and
   the haze of the optical part is less than or equal the haze of the diffusing part.

2. The backlight module according to claim 1, wherein the optical microstructures are recessed from the lower surface toward the plate body, and the light receiving surface is located between the light source and the shady surface.

3. The backlight module according to claim 1, wherein the optical microstructures protrude from the lower surface away from the plate body, and the shady surface is located between the light source and the light receiving surface.

4. The backlight module according to claim 1, wherein an angle between the shady surface and the lower surface is ranged between 5 degrees and 90 degrees.

5. The backlight module according to claim 1, wherein a material of the brightness enhancement component comprises a light-transmitting material, and a refractive index of the light-transmitting material is ranged between 1.6 and 1.65.

6. The backlight module according to claim 1, wherein the haze of the optical part is ranged between 30% and 60%.

7. The backlight module according to claim 1, wherein the haze of the optical part is less than or equal to a haze of the diffusing part.

* * * * *